United States Patent
Denigan, III et al.

(10) Patent No.: US 11,361,419 B2
(45) Date of Patent: Jun. 14, 2022

(54) CURB INSPECTION TOOL

(71) Applicant: Rieker Incorporated, Aston, PA (US)

(72) Inventors: Edward P. Denigan, III, West Chester, PA (US); Manoj Kumar Vajjara Ravichandran, West Chester, PA (US); Peter John Hanchette, Glenn Mills, PA (US)

(73) Assignee: Rieker Incorporated, Aston, PA (US)

( * ) Notice: Subject to any disclaimer, the term of this patent is extended or adjusted under 35 U.S.C. 154(b) by 95 days.

(21) Appl. No.: 16/835,795

(22) Filed: Mar. 31, 2020

(65) Prior Publication Data

US 2021/0082102 A1 Mar. 18, 2021

Related U.S. Application Data

(60) Provisional application No. 62/899,411, filed on Sep. 12, 2019, provisional application No. 62/932,199, filed on Nov. 7, 2019.

(51) Int. Cl.
| | |
|---|---|
| *G06T 7/00* | (2017.01) |
| *G06T 7/73* | (2017.01) |
| *G06T 15/20* | (2011.01) |
| *G01C 9/00* | (2006.01) |

(52) U.S. Cl.
CPC .............. *G06T 7/0002* (2013.01); *G01C 9/00* (2013.01); *G06T 7/75* (2017.01); *G06T 15/205* (2013.01); *G06T 2207/10028* (2013.01); *G06T 2207/30204* (2013.01); *G06T 2215/16* (2013.01)

(58) Field of Classification Search
CPC ....... G06T 7/0002; G06T 7/75; G06T 15/205; G06T 2207/30204; G06T 2215/16; G06T 2207/10028; G06T 7/60; G06T 2200/08; G06T 2210/56; G06T 2210/04; G06T 15/04; G06T 17/00; G01C 9/00; G01C 9/02
See application file for complete search history.

(56) References Cited

U.S. PATENT DOCUMENTS

| | | | | |
|---|---|---|---|---|
| 7,000,328 | B1 * | 2/2006 | Iliff | G01B 3/28 33/333 |
| 8,401,276 | B1 * | 3/2013 | Choe | G06T 7/30 382/154 |
| 10,794,710 | B1 * | 10/2020 | Liu | H04N 13/239 |
| 10,984,259 | B2 * | 4/2021 | Stein | G06K 9/52 |
| 2006/0271287 | A1 * | 11/2006 | Gold | G01C 21/3673 701/426 |
| 2014/0334878 | A1 * | 11/2014 | Miller | E01C 23/0933 405/154.1 |

(Continued)

*Primary Examiner* — Christopher M Brandt
(74) *Attorney, Agent, or Firm* — Blank Rome LLP

(57) ABSTRACT

Techniques for measuring a monument, including obtaining a set of two or more images of a monument environment, detecting a set of markers in the set of images, wherein the set of markers are positioned on a plane level with respect to gravity by a leveling device, and wherein the leveling device is configured to automatically level the markers, generating a virtual representation of the monument environment with respect to gravity, mapping the monument to a virtual representation, determining one or more slopes and dimensions of the monument based on the mapped monument and the gravity plane, and outputting the one or more slopes and dimensions of the monument.

22 Claims, 9 Drawing Sheets

(56) References Cited

U.S. PATENT DOCUMENTS

| | | | |
|---|---|---|---|
| 2015/0213653 A1* | 7/2015 | Kord | G06T 19/20 |
| | | | 345/420 |
| 2015/0269446 A1* | 9/2015 | Takemae | G06T 7/73 |
| | | | 382/199 |
| 2016/0239976 A1* | 8/2016 | Fathi | G06T 7/579 |
| 2017/0111580 A1* | 4/2017 | Chang | H04N 5/23238 |
| 2017/0352199 A1* | 12/2017 | Finley | G06T 7/13 |
| 2018/0228359 A1* | 8/2018 | Meyer | G06T 7/70 |
| 2019/0186907 A1* | 6/2019 | Lau | G01C 15/00 |
| 2020/0294401 A1* | 9/2020 | Kerecsen | G05D 1/0287 |

\* cited by examiner

FIG. 7

CURB INSPECTION TOOL

CROSS-REFERENCE TO RELATED APPLICATIONS

This application claims priority to U.S. Provisional Application No. US 62/899,411, filed Sep. 12, 2019, and U.S. Provisional Application No. US 62/932,199, filed Nov. 7, 2019, both of which are hereby incorporated by reference.

BACKGROUND

The Americans with Disabilities Act (ADA) includes requirements to make public areas accessible to people using wheelchairs, walkers, scooters, or other assistive devices, To provide such access to sidewalks and other such areas which are elevated from a road surface, a curb cut, or ramp may be required. A curb ramp is a ramp from the top of a higher surface, such as a sidewalk, entryway, etc., to a lower surface, such as a road surface, parking lot, etc. The ADA includes specific requirements for curb ramp, such as the slope, width, presence of detectable warnings, transitions, etc. To help ensure compliance with the ADA requirements, after a curb ramp is bunt, the curb ramp may be inspected for compliance with the ADA requirements.

Currently, inspections compliance with ADA requirements for curb ramps is often performed manually using measuring tapes, levels, etc. However, these manual techniques can be time consuming, labor intensive, and are difficult to replicate and repeat. What is desired is a curb ramp inspection tool that is accurate, repeatable, convenient to use, and can reduce the amount of labor required to inspect curb ramps.

SUMMARY

This disclosure relates to techniques for obtaining three-dimensional (3D) data points of the curb ramp under inspection. Using this information and recognition of markers, the x, y and z coordinates of points of interest are determined. Distance and slope measurements are calculated from the 3D points in space. A detailed report is automatically generated.

Images of the target curb ramp can be taken from around the feature using a device referred to as monopod. The monopod may be an imaging system configured to obtain multiple images of the target curb ramp from multiple angles from a single location of the monopod. The acquired images are then used to obtain 3D data points using photogrammetric range imaging techniques, such as a structure from motion (SFM) technique.

A gravity reference, such as a self-levelling plane, referred to as the automated reference plane (ARP), is used to obtain reference to gravity and scale. The ARP may utilize a dual axis inclinometer to determine a reference (e.g., gravity) plane. This reference plane information may be used to align the obtained 3D curb ramp information. Additionally, markers may be included on the ARP at known distances and used to provide a scale reference for the obtained 3D curb ramp information. Based on the gravity and scale reference slope and distance measurements may be calculated. These measurements may be used to verify compliance to ADA standards for the target curb ramp and generate a report.

BRIEF DESCRIPTION OF THE DRAWINGS

For a detailed description of various examples, reference will now be made to the accompanying drawings in which:

FIG. 7 is a sample report, in accordance with aspects of the present disclosure.

DETAILED DESCRIPTION

Figure 1:
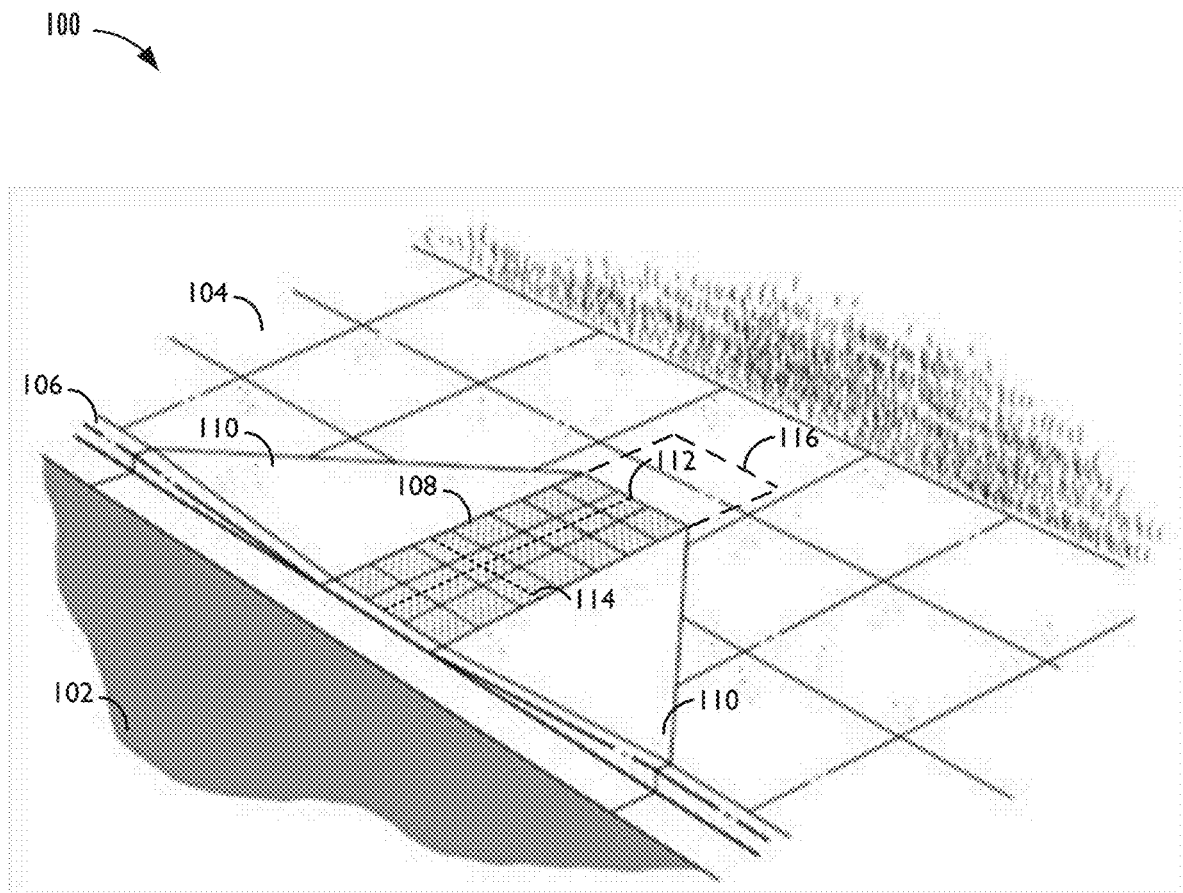
FIG. 1 illustrates an example curb ramp environment.

FIG. 1 illustrates an example curb ramp environment 100. The curb ramp environment 100 includes a road 102, an elevated sidewalk 104, which is edged by a curb 106. The sidewalk 104 includes a curb ramp 108 leading into the road 102. The curb ramp 108 includes a set of ramp flares 110 adjacent to curb ramp 108. In this representation, curb ramp 108 has multiple features, which are defined by a set of imaginary dotted lines running on the surface and adjoining areas of the curb ramp 108. Here, a length of line 112 defines a ramp run length of the curb ramp 108. Line 112 also has a ramp running slope, as against a gravity plane. The gravity plane is an imaginary plane perpendicular to the pull of gravity, and therefore horizontally level. A length of line 114 defines a ramp clear width and has a ramp cross slope. The sidewalk 104 also includes a turning space 116, here outlined by a set of dashed lines, at the top of curb ramp 108, which allows an accessible route to connect to the ramp opening on the sidewalk 104.

Figure 2:
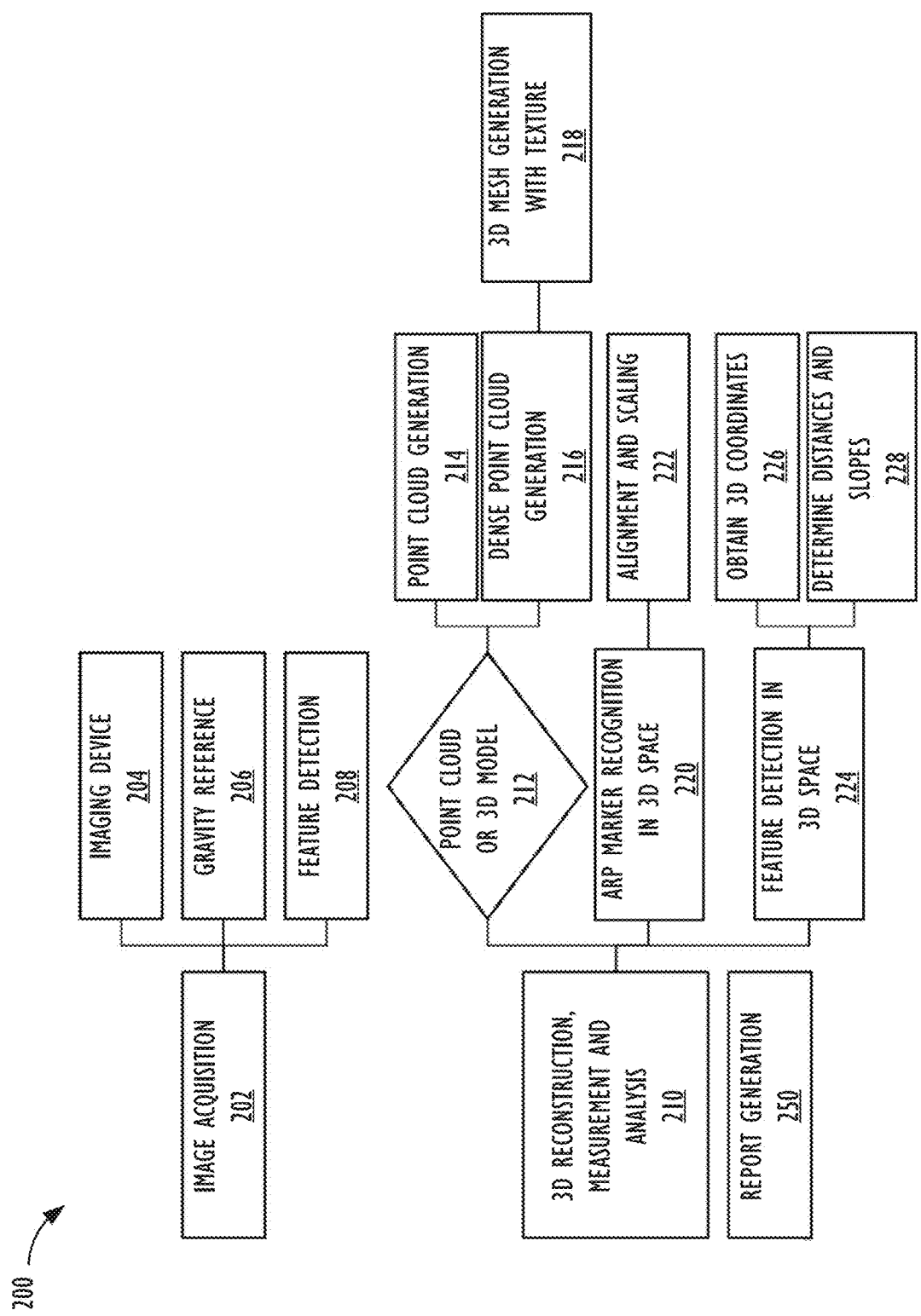
FIG. 2 illustrates the elements of an inspection tool, in accordance with aspects of the present disclosure.

FIG. 2 illustrates the elements of an inspection tool 200, in accordance with aspects of the present disclosure. As shown, the inspection tool 200 may include three components or stages, image acquisition stage 202, 3D reconstruction, measurement, and analysis stage 210, and report generation stage 250. First, in the image acquisition stage 202, digital images of the target curb ramp environment are captured. In certain embodiments, these images may be acquired using an image capture device 204, such as a camera mounted to a moveable support structure, such as a tripod, monopod, or a staff. Imaging techniques, such as photogrammetry, structure from motion (SFM), laser scanning, and/or stereo imaging, may be used to reconstruct 3D model using images of a target object taken from multiple perspectives. It may be noted that while described in within context of a curb ramp environment, the inspection tool 200 may be used to measure and inspect any suitable environment and/or monument. As used herein, a monument refers to any structure or construct being inspected, for example, a curb ramp. As used herein, the monument environment refers to areas around the monument.

The image acquisition step 202 may include three components, the imaging device 204, gravity reference 206, and feature detection 208. In certain cases, feature detection 208 may be based on surface markers. These surface markers may be placed on surfaces of the curb ramp environment to facilitate autonomous identification of various features of the curb ramp environment. For example, to obtain the X and Y distance of a turning space part of the curb ramp environment, a set of surface markers may be placed, prior to image acquisition, to define the boundaries of the turning space. The surface markers may be placed, for example, by an inspector. Each surface marker may include a unique, with respect to the other markers, visible pattern, for example printed on the surface marker, to aid identification of the marker. In other cases, feature detection 208 may be performed using machine learning (ML) techniques. In such cases, surface markers may be omitted.

The gravity reference 206 is a device configured to determine a gravity plane and automatically level a surface to the gravity plane. The gravity reference may also be referred to as an automated reference plane 206. The gravity reference 206 may be placed on or near the target curb ramp within the field of vision of the imaging devices. For example, the gravity reference 206 may be placed in the turning space 116. The gravity reference 206 includes a self-levelling plane, such as a plate or set of arms, that may be used as a reference to a gravity plane and for scale. The gravity reference 206 may include markers, similar to the surface markers 208, fixed to the gravity reference 206. For example, markers may be fixed to known positions on the self-leveling plane to aid detection and measurement. In certain cases, the dimensions of the gravity reference may be known and used for scale in lieu of markers fixed to the gravity reference. In certain cases, a gravity and scale reference device could be a device utilizing a digital inclinometer and may include markers. Measurements from the inclinometer may be used to determine a compensation factor for aligning a model to the gravity plane. The markers may be used as a reference for scale. In certain embodiments, the ARP includes a dual axis inclinometer, such as a Rieker H6 sensor. The inclinometer used in the ARP may be, in certain cases, accurate and calibrated to a standard, such as to a National Institute of Standards and Technology (NIST) standard. The image capture device 204 includes a set of imaging devices and is used to capture images of the target curb ramp environment from positions around the target curb ramp.

The images acquired in image acquisition stage 202 are processed in the reconstruction, measurement and analysis stage 210. The reconstruction, measurement, and analysis stage 210 may be performed, for example, by a custom configured computer integrated on the image capture device, or by a separate computing device. After a set of images of the curb ramp environment are acquired, the images are digitally processed using computer vision techniques such as structure from motion, optical flow, and/or photogrammetry to estimate positions of identified common points between the images in 3D space and position of the cameras. The outputs may be used to generate a point cloud or 3D model 212 of the target curb ramp environment. A point cloud may be generated at step 214. For the 3D model, a dense point cloud may be generated at step 216. The dense point cloud differs form a point cloud in that the dense point cloud includes more points of reference and is used to generate a 3D mesh model 218 of the ramp curb environment. A textured 3D mesh model may be generated by mapping textures obtained from the images onto the mesh model. A point cloud and the surface markers may be used to obtain measurements to reduce computational complexity and time as compared to a dense point cloud and 3D model that may be textured.

A computer vision recognition algorithm may be used to detect and recognize markers affixed to the ARP at step 220. In cases where feature markers are used, the surface markers are also detected and recognized. For example, the markers on the ARP and feature markers (if used) may include unique identifiers which distinguish the markers from the curb ramp environment as well as from other markers. The markers may be recognized using computer vision techniques and their locations determined. In certain cases, the markers may be recognized in the textured 3D model. At step 222, the 3D positioning information of the markers on ARP are used to determine a gravity plane to which the point cloud or 3D model may be aligned. In certain cases, scaling may be performed based on relative distance between markers on the ARP. For example, markers on the ARP may be placed a known distance apart. Scaling may be performed based on this known distance, which also helps provide traceability to a NIST standard. In certain cases, the known size of markers, the relative size of ARP device itself, or a calibrated set of cameras may be used as a reference to scale the 3D model or point cloud.

At step 224, feature detection may be performed. In cases where feature markers are used, the feature markers that were placed around the curb ramp environment are detected in a manner similar to that described in step 220 and at step 226 3D coordinates of these feature markers are determined. In certain cases, artificial intelligence (AI) based techniques may be used for feature detection. Machine learning is a subset of AI and ML helps enable a software system to learn to recognize patterns from data without being directly programmed to do so. Machine learning can refer to a wide range of techniques. Examples of ML techniques can include logistic regression, support vector machines, decision trees, autoencoders, neural networks, deep learning, etc. ML techniques may be based on supervised, semi-supervised, or unsupervised learning techniques. Once trained, the ML system may be used in the operating phase to locate various features of the curb ramp in the images captured. This location information may then be used at step 226 to determine 3D coordinates corresponding to the detected features in the images. At step 228, distances and slopes between 3D coordinates of features markers may be determined.

Figure 3B:
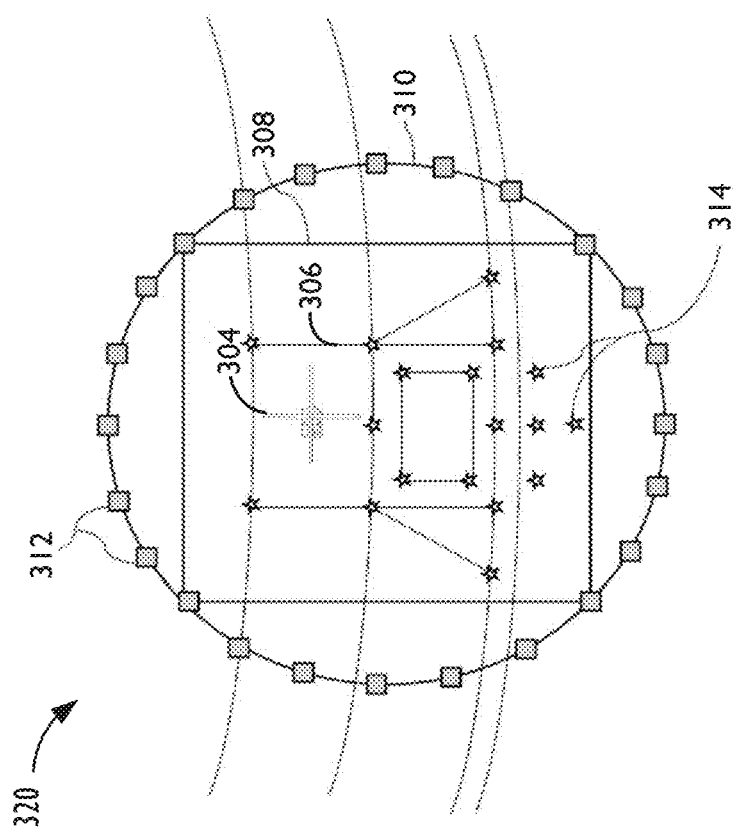
FIGS. 3A-3B are top down views illustrating use of the inspection tool at an inspection site, in accordance with aspects of the present disclosure.
Figure 3A:
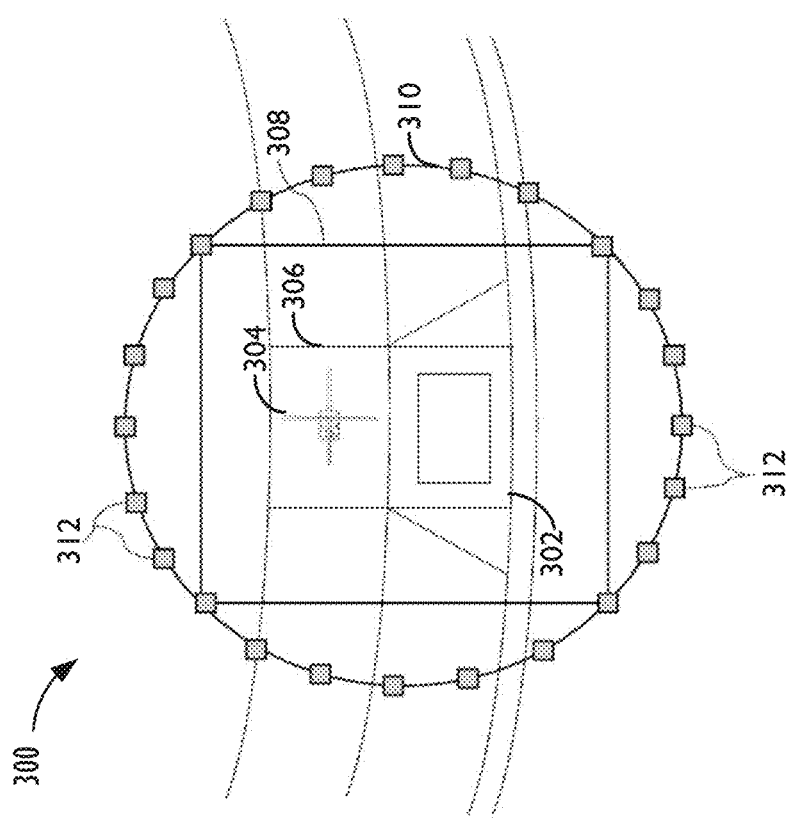

FIGS. 3A-3B are top down views illustrating use of the inspection tool at an inspection site, in accordance with aspects of the present disclosure. In FIG. 3A, target area 300 includes curb ramp 302, along with an ARP 304 placed in a turning space 306 of curb ramp 302. Imaginary bounding box 308 around the curb ramp 302 illustrates a target area for which 3D data points may be obtained. Ring 310 illustrates an approximate path of a user, such as an inspector, may move the image capture device around the curb ramp environment. The user, such as the inspector, may stop at approximately equidistant intervals along ring 310 to capture images using the image capture device, such as a monopod image capture device. Boxes 312 represent the various positions of the imaging device during which images may be captured around the curb ramp 302. Images may be captured from each position with the one or more cameras of the imaging device facing substantially orthogonally inward toward boundary of the imaginary bounding box 308. In certain cases, the images may be captured in a pattern around the curb ramp 302. After a set of images are captured from a position, the user may move the imaging device to the next position, aim the imaging device toward the center of the imaginary bounding box 308, and cause the imaging device to capture another set of images. In FIG. 3B, target area 320 has stars 314, which represent markers placed on surfaces of the curb ramp environment.

Figure 4:
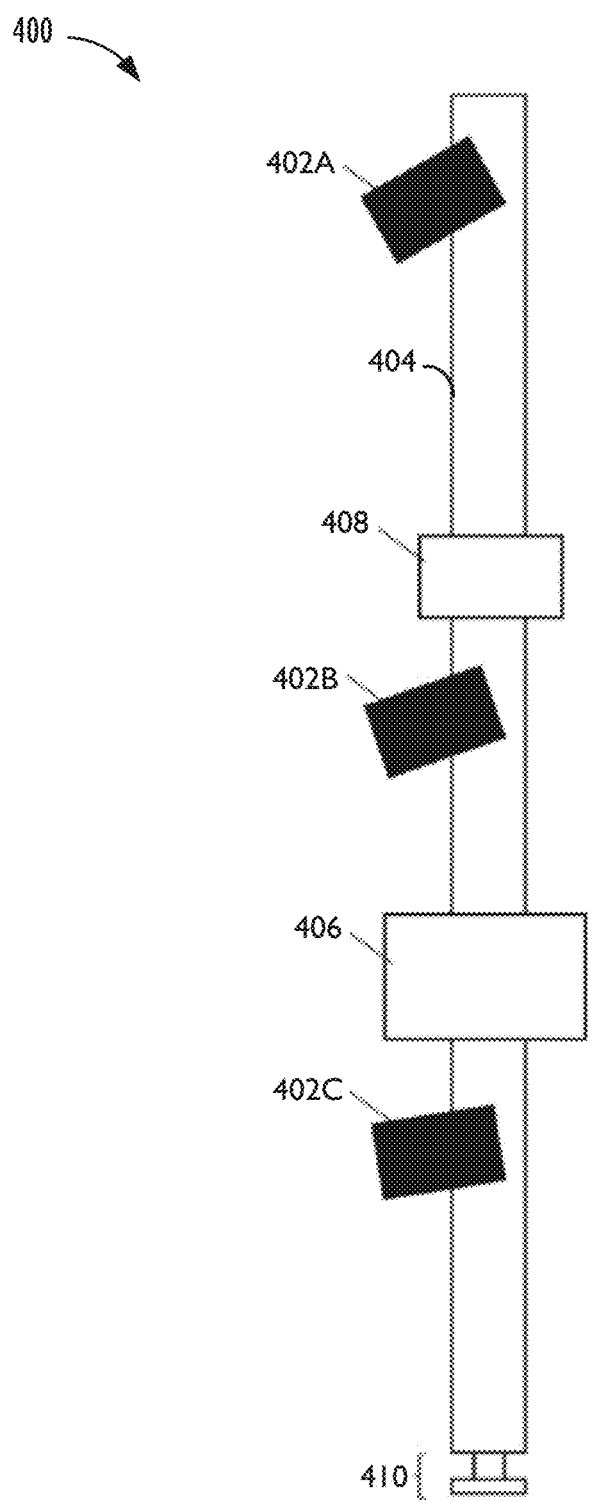
FIG. 4 is a schematic illustrating an exemplary monopod, in accordance with aspects of the present disclosure.

FIG. 4 is a schematic illustrating an exemplary monopod image capture device 400, in accordance with aspects of the present disclosure. While a monopod is discussed in this embodiment, it can be understood that other moveable imaging devices may be used, for example, handheld, a tripod, or other shapes have auxiliary support or stabilization legs, flared base, etc. The monopod image capture device 400 includes a set of cameras 402A-402C (collectively 402) mounted at various angles. The set of cameras may include multiple cameras to enable capturing multiple images at substantially the same time. This example embodiment includes three cameras, a top camera 402A, middle camera 402B, and a bottom camera 402C mounted at pre-determined angles with respect to the monopod body 404. In this embodiment, the monopod body 404 is staff shaped. In certain cases, the cameras may be angled such that there is an overlap between the images produced by the cameras. This overlap helps establish a relationship between all the images during processing. In certain cases, the cameras may all point in the same direction within the curb ramp environment but are angled differently with respect to the ground plane. For example, when viewed from above the monopod body 404, the cameras may be pointed at the same angle and an inspector may adjust the angle of all the cameras by rotating the monopod body 404. In certain cases, the cameras may point in different, but overlapping directions, within the curb ramp environment. The number of cameras may vary, for example, based on a field of view, camera angle, and/or resolution of the cameras. In this example, the monopod image capture device 400 is equipped with three machine vision cameras 402A-402C mounted at fixed angles on a six feet tall pole enabling three perspectives to be captured. In certain cases, the angles of the cameras 402 may be adjustable, for example, based on a set of predefined angles, or freely within a range. In certain cases, the cameras 402 or monopod body 404, may include an inclinometer or other angle sensor to detect and store the adjusted angle of the cameras. In certain cases, the angles may be manually measured and inputted. The single-pole design helps facilitate user mobility to take pictures and walk around the curb ramp and curb ramp environment.

The images can be acquired with any type of camera, such as a consumer grade camera or digital camera. In certain cases, machine vision cameras, such as those used in an industrial setting for visual inspection, may be used. Machine vision cameras generally have a smaller footprint and can produce unfiltered or processed images, as compared to a typical consumer grade camera. In certain cases, cameras with a monochrome sensor may be used. In a typical color camera sensor, such as an RGB sensor with a Bayer filter, the image is split between red, green and blue channels, each color with their own corresponding set of pixels and a full resolution image is interpolated across the colors. Regardless of the channel used, the full resolution image is an interpolated image. A monochrome camera generally will produce a full resolution image without interpolation. In certain cases, a higher resolution color camera sensor capable of producing a sufficiently high resolution to meet target resolution requirements using a single color channel may be used. In this example, a 16 mm focal length machine vision lens capable of producing a 1.1" format image circle is selected to allow for a working distance of 5 feet. In certain cases, the focus on the lens may be set at infinity so that objects beyond 5 feet are in focus. Using a fixed focus rather than auto-focus can help reduce moving parts and help maintain optical performance and reducing hardware/software complexities. Where a fixed focus is used, the user may need to operate the monopod 400 at a minimum distance away from the target curb ramp during the inspection process.

In this example, the monopod 400 includes machine vision cameras 402 equipped with a 12 megapixels sensor in a 1.1" sensor format, resulting in 3.45 µm pixel size. The choice of sensor's format and resolution may be based on a desired ability to resolve details in the image to a certain accuracy. In this example, the selected cameras can produce images from which measurements can be obtained to an accuracy of 0.1 inches. In certain cases, the cameras 402 may be mounted at predetermined heights on the monopod 400. For example, the heights of the cameras may be fixed or adjustable to predetermined heights. Heights may be selected based on the curb ramp environment. In certain cases, the height of a lowest camera may be selected to provide as much ground detail as possible, but still avoid expected curb steps and elevation changes. Heights for cameras above the lowest camera may be selected to maximize spacing, but maintain an amount of overlap in the vertical direction.

A customized integrated computer 406 may be included on the monopod body 404. This computer 406 may be an industrial computer and may include customized software to acquire multiple images, along with various metadata, and store the images and metadata. In certain cases, computer 406 can be a processing device, such as a processor. A touch sensitive display 408 may also be mounted to the monopole body 404. The touch sensitive display may be used to control and/or interact with the computer 406 by a user, for example, to cause a set of images to be taken, provide input, etc. Adjustable handles may be fixed to the monopod body 406 to allow users to lift and move the monopod 400. The monopod body 404 may also include a swivel base 410 to help allows the user to adjust the field of view of the cameras 402 or otherwise rotate the monopod 400. The components of the monopod 400 may be chosen based on various factors, such as a particular acquisition setup intended for the monopod 400, including accuracy and operator requirements, examples of which include working distance, ease of acquisition, weather/environmental resistance, etc. The monopod 404 may also include integrated wireless fidelity (Wi-Fi) and global positioning system (GPS) elements to enable geo-tagging of inspections. For example, when images are acquired, the images may be tagged with metadata including location information obtained based on an integrated GPS system and/or obtained, via Wi-Fi, from a connected location provider.

Figure 5A:
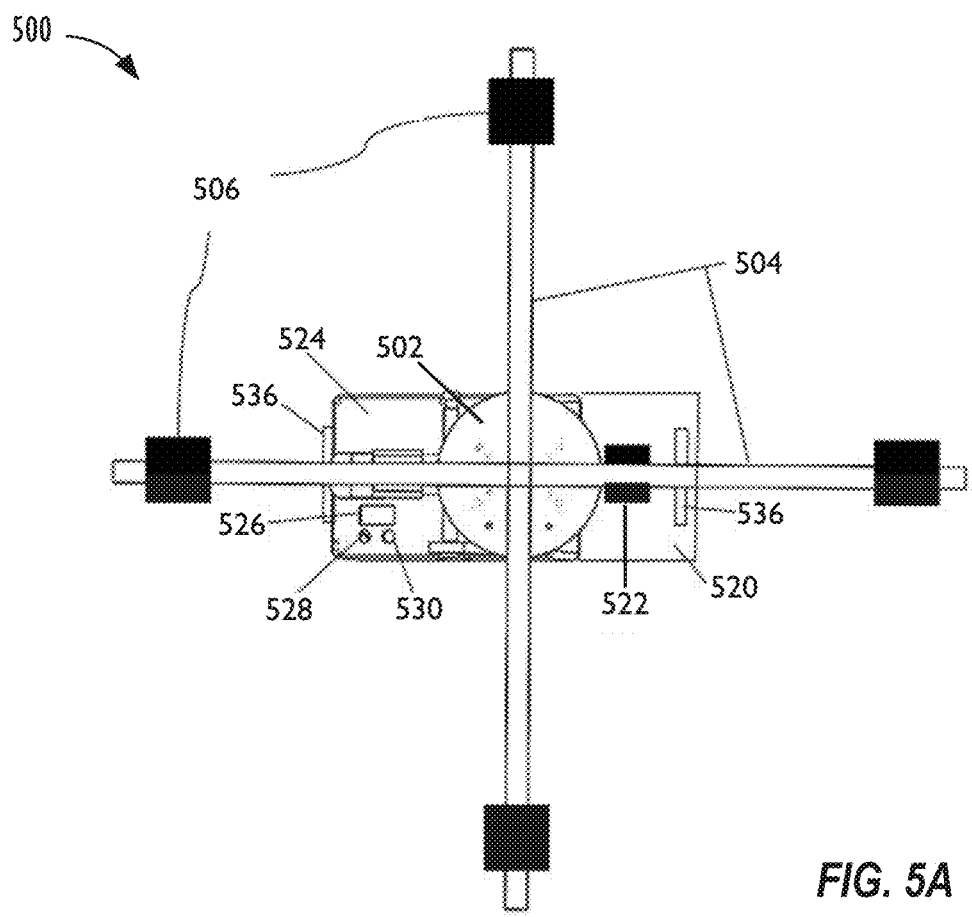
FIGS. 5A-5B are schematics illustrating an exemplary ARP in accordance with aspects of the present disclosure.
Figure 5B:
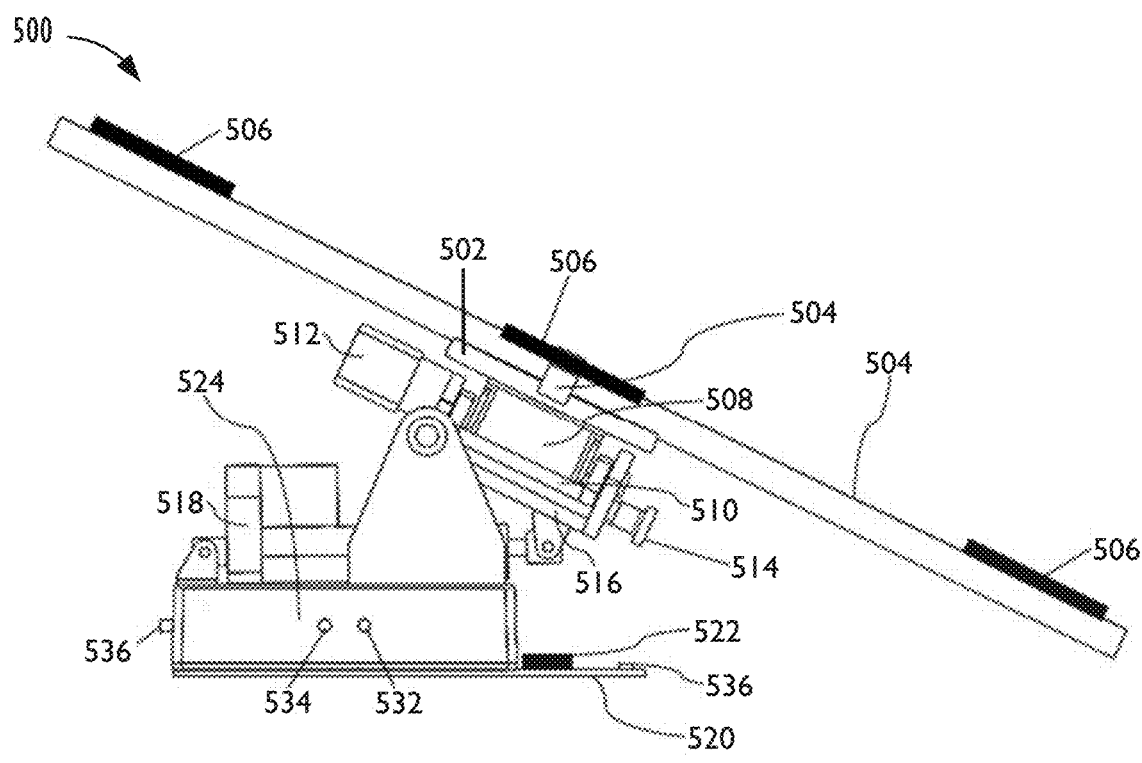

FIGS. 5A-5B are schematics illustrating an exemplary ARP 500 in accordance with aspects of the present disclosure. The ARP is an example gravity reference device used to provide a gravity plane, or level reference. FIG. 5A shows a top view of the ARP 500 when the ARP 500 is aligned with a gravity plane. In this exemplary embodiment, a top plate is aligned to 0° with respect to the gravity plane. The gravity plane is an imaginary plane perpendicular to a direction of pull of gravity such that an object aligned with the gravity plane is level. FIG. 5B shows a front view of the ARP 500 in an inactive state, where the top plate is not aligned with the gravity plane. As used herein, the top plate is one or more surfaces that are aligned with the gravity plane. In certain cases, the top plate may be a flat plate or circular surface. In this exemplary embodiment, the top plate includes a top stage 502 with multiple axis bars 504 mounted on the top stage 502. Markers 506 are mounted to the axis bars 504. The markers 506 are detected in images are used as a gravity plane and scale reference. In certain cases, the size and/or shape of the ARP may be known in advance and the makers 506 and/or axis bars 504 may be omitted. In certain cases, the top stage 502 and axis bars 504 may be detachably coupled. For example, the top stage 502 may include grooves or slots into which the axis bars 504 may fit into. In addition, the axis bars 504 may include complementary groves or slots to help align the axis bars 504 together and/or with the top stage 502. In certain cases, magnets (not shown) may be used to hold the axis bars 504 in place. The magnets help facilitate moving the ARP 500 and also allow the axis bars 504 to be separated in case a user accidentally bumps or tries to lift the device.

The ARP 500 includes an inclinometer 508 to measure an angle of the top plate. In certain cases, multiple inclinometers may be used. These inclinometers may be single-axis or multi-axis inclinometers. In this example, a single Rieker's H6 sensor is mounted to the top stage 502 in an inverted position. In certain cases, the ARP 500 may include a first adapter plate 510, which may allow movement in one axis. The first adapter plate 510 may be coupled to one or more stepper motors 512. A pull and twist mechanism 514 may be used to lock one or more axes during transportation. The first adapter plate 510 may be mounted on a second adapter plate 516 that is coupled to a linear actuator 518. The stepper motor 512 and linear actuator 518 allow the axis bars 504 to be moved in either of two axes. It may be understood that while a stepper motor and a linear actuator are shown in this embodiment, any known actuator, such as an electronic, hydraulic, or pneumatic motor or actuator, may be used. In this example, the ARP 500 uses a Rieker H6 inclinometer to determine inclination of top plate of the ARP 500 with respect to gravity. The H6 sensor is accurate to 0.1° and is compliant with NIST standards. The on-board controller automatically controls two stepper motors to move the top plate to 0° inclination based on reading from the H6. In certain cases, the ARP 500 may be calibrated prior to use, for example during production, by a user during a calibration procedure, via a self-calibration routine, etc.

The ARP 500 includes a base 520, which may include a metal plate. The base 520 may include a battery mount 522. In certain cases, the battery mount 522 may be configured to accept a generic electric tool battery, such as a drill battery, for power. In this example, a body 524 may be mounted on the base 520. The body 524 may be a box and may be used to hold control circuitry, stepper motor drivers, etc. for controlling the ARP 500. The body 524 may include a power switch 526 as well as push button 528 for starting and stopping the ARP 500, push button 530 for moving the linear actuator 518 motor to an initial position, for example, for transportation. The body 524 may also include a power light emitting diode (LED) 532 and an aligned LED 534 to indicate whether the top stage 502 is in a gravity aligned state. In certain cases, the LEDs may be sun-readable and the aligned LED 534 may be a multi-color LED. In certain cases, the LEDs may be dome-shaped and mounted on any or on multiple portions of the body 524 to help a user determine the state of the ARP 500 from multiple positions. For example, the LEDs may be mounted on the front and back sides of the body 524. The ARP 500 may also include one or more carry handles 536.

As discussed above, the ARP 500 provides a gravity and scale reference for images taken by the imaging device. While discussed in the context of an electronic device, it may be understood that a passive or analog gravity reference may also be used. Generally, when a 3D model is rendered, the 3D modelling software aligns the bottom of the 3D model to an arbitrary virtual plane.

When finding the slope between two points on the 3d model, the determined slope is respective to the virtual plane and not the ground (e.g., gravity) plane. Thus, a slope with respect to level ground cannot be determined through the obtained 3d points without a reference to the gravity plane. For example, if a road or turning space of a curb ramp is used to align a 3D model, a determined slope between two points on the curb ramp may be 2° with respect to surface used to align the model. However, if the initially chosen ground plane (road or turning space) is tilted by 10° with respect to the gravity plane, the actual slope is 12° which is beyond ADA compliance and all slopes calculated from the model will be off by 10°.

During imaging, the ARP 500 is placed on or about the curb ramp and is reconstructed in the 3D model along with the curb ramp environment, as discussed above with reference to step 210 of FIG. 2. Once activated, the top plate 502 and/or axis bars 504 are aligned to gravity. When the 3D model and/or point cloud is generated, the 3D model and/or point cloud is aligned using the gravity plane reference of the top plate 502, axis bars 504, and/or markers 506 on the axis bars 504.

In certain cases, the markers 506 or the ARP itself provides a scale reference. Typically, reconstructed/rendered 3D models use an arbitrary scale and measurement unit to build the 3D models. Absent a scale reference, it may be difficult to accurately measure the curb ramp and curb ramp environment. The markers 506 on the axis bars 504 are at a fixed distance apart and can be used to determine the scale of the 3D model and/or point cloud.

After images of the curb ramp environment have been obtained, 3D reconstruction of the curb ramp environment is performed. This reconstruction may be performed using optical imagining techniques, as described above in conjunction with stage 210 of FIG. 2. These measurements may be used to generate a point cloud or a dense point cloud.

The generated point cloud/3D model may be scaled based on the known size of the ARP and/or fixed distance between the markers 506 on the axis bars 504 and aligned with the gravity plane based on the angle of the top plate 502, axis bars 504, and/or markers 506. The ARP and/or markers 506 are detected in the images and mapped to the point cloud or 3D mesh. In certain cases, in addition to the markers 506 on the axis bars 504 feature markers may be placed on the ground, for example, to identify the features of curb ramp environment. The markers may be placed, for example, by a user based on a protocol. The protocol may call, in certain cases, for certain markers to be placed on specific portions of the curb ramp environment. For example, referring back to FIG. 3, markers may be placed at the corners of the turning circle, corners and middle of the top and bottom of the curb ramp, corners of the ramp flares, at corners of an area having detectable warnings, and on the road surface. The markers, and corresponding feature points, may be used to make slope and distance measurements of the curb ramp environment. In other cases, feature points of the curb ramp environment may be detected and located using ML techniques and these detected feature points used to make slope and distance measurements. In certain cases, markers may be optionally used. For example, the curb ramp inspection tool may be configured to use markers if they are detected, either on the ARP or in the environment. Use of markers, in certain cases, may offer faster image processing, but may require more time to prepare the curb ramp environment for inspection. If markers are not detected on features and/or the ARP, AI techniques may be employed.

Figure 6:
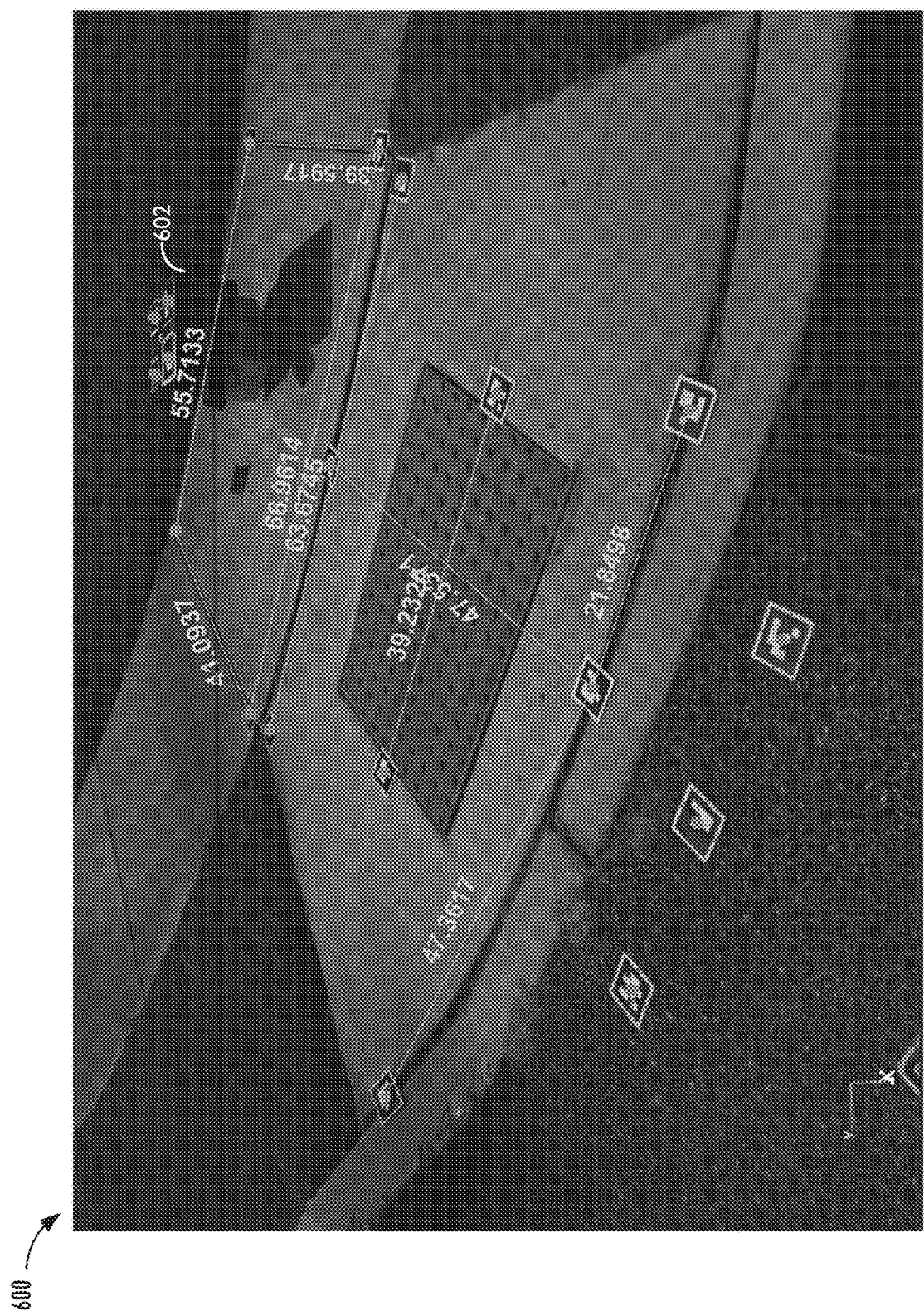
FIG. 6 illustrates a 3D model of a curb ramp environment, in accordance with aspects of the present disclosure.

FIG. 6 illustrates a 3D model 600 of a curb ramp environment, in accordance with aspects of the present disclosure. In this embodiment, the 3D model 600 includes markers placed on features of the curb ramp environment with distance measurements overlaid for display purposes. Of note the 3D model 600 includes an embodiment of an ARP 602 of a different design than that discussed in conjunction with FIGS. 5A and 5B. Here, ARP 602 includes a self-leveling top plate or surface with a set of markers positioned at a known distance apart. Once the 3D model 600 of a ramp environment is created based on captured images, the captured images may be removed, and the model retained, for example for auditing, reporting, or other purposes. In certain cases, additional processing may be performed, for example, to highlight or report if certain inspection parameters are exceeded. For example, object detectors may be used to detect potential issues, such as obstructions in the curb ramp environment, presence of tactile warnings, slope exceeding requirements, etc. In certain cases, these issues may be output, along with other measurements related to the curb environment in a report. In certain cases, the issues and measurements may be used to determine a pass/fail criterion for the monument as against a predefined set of characteristics. For example, the measurements may be compared to a predetermined set of thresholds for the measurements and checked for other issues, such as obstructions, detected features, etc., to generate a pass/fail score for the monument. In certain cases, the 3D model may be output as one or more 3D drawings or figures.

Figure 7:
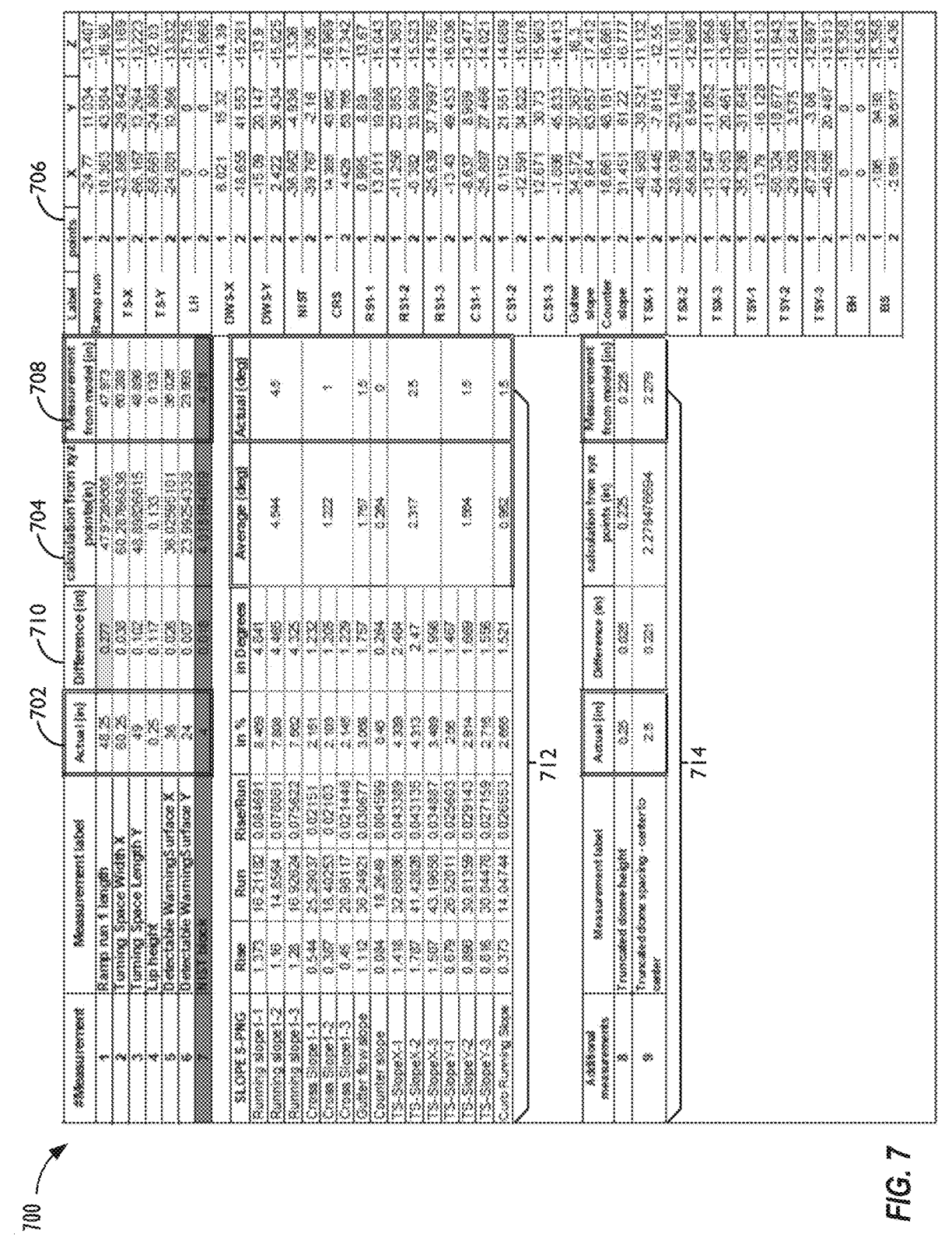

FIG. 7 is a sample report 700, in accordance with aspects of the present disclosure. As referenced with respect to step 250 of FIG. 1, a report about the curb ramp environment may be generated based on measurements made based on the markers. Sample report 700 includes seven rows of column 702, indicating the actual measurements of respective curb ramp features by an inspector using prior art methods. Column 704 shows distance measurements of features calculated by a distance formula from respective X, Y and Z coordinated listed in columns 706. Column 708 shows the measurements from column 704 rounded to three decimal places. Column 710 indicates a difference in measurements between actual measurements made using prior art techniques, such as by hand with a measuring tape, and measurements obtained using the proposed curb ramp inspection tool. Table 712 illustrates slope measurements calculated using distance formula and slope equations. In this example, slopes are shown in degree as well as percent grades. Table 714 illustrates extended capabilities of the proposed technique. For example, detection surfaces may include truncated domes to provide a detectable warning of a curb ramp. In certain cases, the inspection tool can be used to measure the truncated domes' height and spacing measurements. The measurement may be based, for example, on a marker positioned on a truncated dome, and another maker positioned in the warning area, but not on a truncated dome. Alternatively, a detectable warning area may be detected based on markers positioned at the corners of the detectable warning area and surface heights from within the detectable warning area determined. Height differences may then be binned to identify the truncated domes. In certain cases, a user may manually select points, for example from the reconstructed 3D mesh model, and perform measurements based on these selected points.

Figure 8:
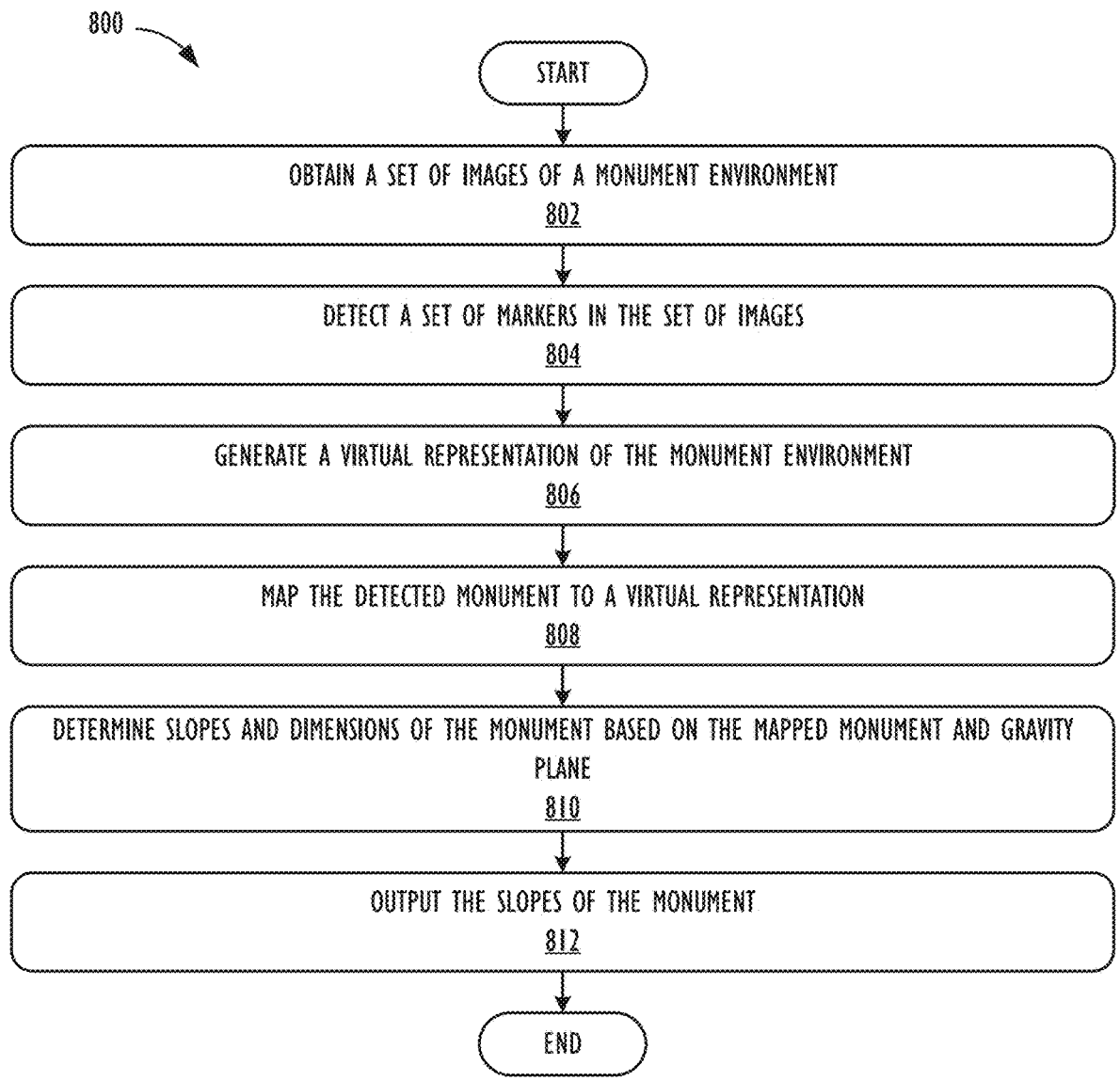
FIG. 8 illustrates a technique for measuring a monument, in accordance with aspects of the present disclosure.

FIG. 8 illustrates a technique for measuring a monument 800, in accordance with aspects of the present disclosure. At block 802, a set of two or more images of a monument environment are obtained. For example, a user, such as an inspector, may capture images of a monument, such as a curb ramp, and environment around the monument using one or more cameras. In certain cases, the user may use a monopole device having multiple camera positioned at different angles on the monopole, such as described in conjunction with FIG. 4, to obtain the images. At block 804, a set of markers are detected in the set of images. For example, a set of markers may be affixed to a surface of a leveling device, such as an ARP. Generally, the leveling device may be any device that may be used to determine a plane with respect to gravity and the leveling device may be a separate device, or included as a portion of another device, such as a camera, monopole device, computer, etc. The ARP, once activated, may be configured to automatically position the set of markers on a plane level with respect to gravity by a leveling device. For example, as discussed above in conjunction with FIG. 5, once activated, a controller may receive input from an inclinometer regarding the inclination of a top plate of the ARP and instruct a set of motors to adjust the inclination of the top plate to move the top plate to a 0° inclination, i.e., horizontal with respect to the gravity plane, as measured by the inclinometer.

At block 806, a virtual representation of the monument environment may be generated with respect to gravity. For example, a point cloud or 3D model of the monument environment may be generated based on the set of images using imaging techniques such as SFM, optical flow and/or photogrammetry. Common points between images are obtained and estimates of these points in 3D space are generated based on positions of corresponding points in other images taken from different perspectives. A gravity plane may be determined based on the relative positions of the markers in the images. For example, markers on the ARP may be detected or recognized in multiple images/video frames taken from different angles. As markers on the ARP may be of a known distance apart, once they are located relative to 3D space, the markers may be used as scale and gravity plane references. Markers on the surface may be used to facilitate detection of points for measurement. The gravity plane is used to define a virtual gravity plane for the virtual representation.

At block 808, the monument is mapped to the virtual representation. For example, positioning information may be determined based on the detected features of the monument and this positioning information may be used to identify and map the monument in the virtual representation. At block 810, one or more slopes and dimensions of the monument may be determined based on the mapped monument and the gravity plane. For example, the virtual representation may be leveled based on the virtual gravity plane. A top, bottom, and sides of the monument may be determined based on the positioning information, and a running and cross slope may be determined for the monument. At block 812, the one or more slopes of the monument is output. For example, a report, such as the example shown in FIG. 7, including the running and cross slopes may be generated and output to the user.

Figure 9:
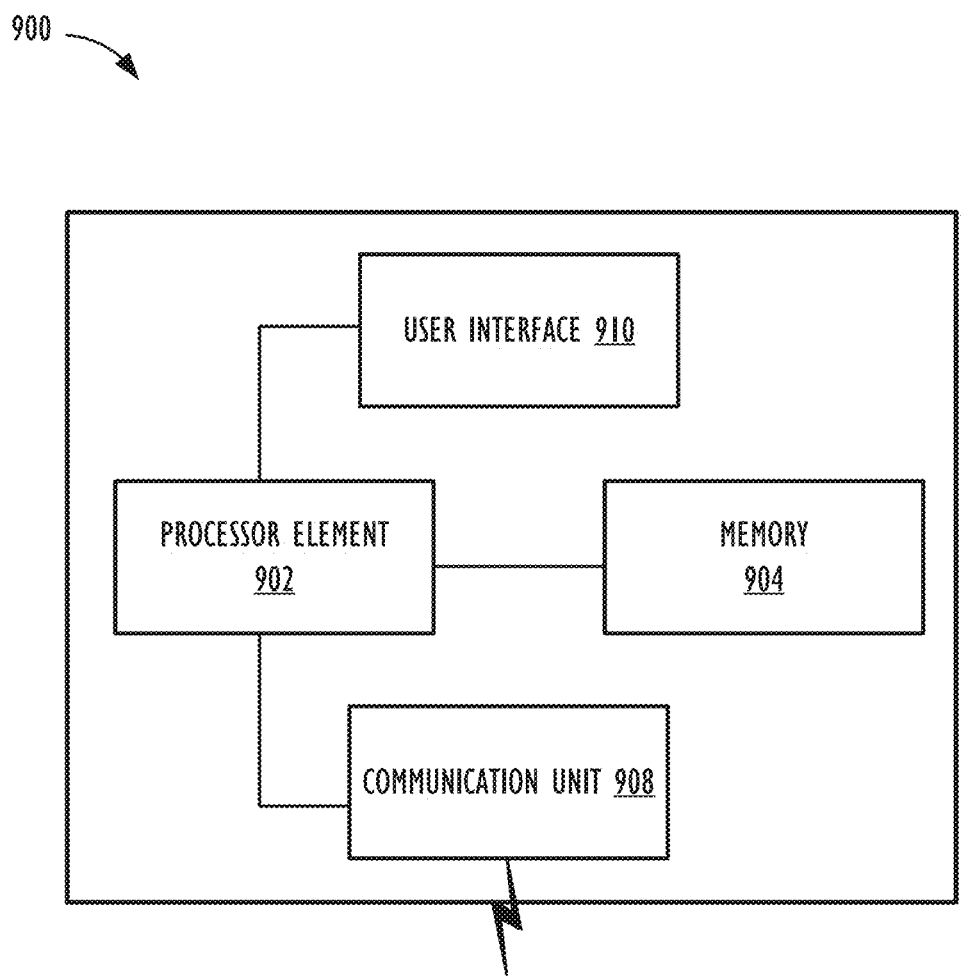
FIG. 9 is a block diagram illustrating a computing device 900, in accordance with aspects of the present disclosure.

Referring now to FIG. 9, a block diagram illustrates a computing device 900 that may be used for implementing the techniques described herein in accordance with one or more embodiments (e.g., computer 406 and technique 800). For example, the computing device 900 illustrated in FIG. 9 could represent a customized computer 406 or a separate computing device. As shown in FIG. 9, the computing device 900 can include one or more input/output devices, such as a communication unit 908 that could include a wired communication component and/or a wireless communications component, which can be coupled to processing element 902. The communication unit 908 can utilize any of a variety of protocols, such as Universal Serial Bus, peripheral component interconnect bus, Ethernet, TCP/IP, to name a few of many protocols, to effect communications between the processing element 902 and other devices, such as a set of imaging devices. Data corresponding to a set of images may be obtained, for example from an imaging device, via the network communication unit 908. The computing device 900 may be in wired or wireless communication with the imaging devices, inclinometers, etc., to receive digital images, inclination angles, etc., and one or more computing devices 900 may be located in a monopod, imaging device, and/or ARP.

The computing device 900 includes a processing element 902 that contains one or more hardware processors, where each hardware processor may have a single or multiple processor cores. Examples of processors include, but are not limited to, a central processing unit (CPU) and microprocessor. Although not illustrated in FIG. 9, the processing element 902 may also include one or more other types of hardware processing components, such as graphics processing units (GPU), application specific integrated circuits (ASICs), field-programmable gate arrays (FPGAs), and/or digital signal processors (DSPs).

FIG. 9 illustrates that memory 904 may be operatively coupled to processing element 902. Memory 904 may be a non-transitory medium configured to store various types of data. For example, memory 904 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

A user interface 910 can include a display, positional input device (such as a mouse, touchpad, touchscreen, or the like), keyboard, or other forms of user input and output devices. The user interface 910 can be coupled to processor element 902. Other output devices that permit a user to program or otherwise use the computing device can be provided in addition to or as an alternative to communication unit 908. When the output device is or includes a display, the display can be implemented in various ways, including by a liquid crystal display (LCD) or light emitting diode (LED) display, such as an organic LED (OLED) display.

Modifications are possible in the described embodiments, and other embodiments are possible, within the scope of the claims. For example, though described for measuring curbs, techniques disclosed herein may be used for other structures or features. Though described in the context of compliance with the ADA, the techniques disclosed herein may be used in in context with other rules, regulations, specification, or guidelines, such as to meet architectural specifications.

What is claimed is:

1. A method for measuring a monument, comprising:
   obtaining a set of two or more images of a monument environment;
   detecting a set of markers in the obtained set of two or more images, wherein the set of markers are positioned on a plane level with respect to gravity by a leveling device, and wherein the leveling device is configured to automatically level the set of markers;
   generating a virtual representation of the monument environment with respect to gravity based on the obtained set of two or more images;
   mapping the monument to a virtual representation;
   determining one or more slopes and dimensions of the monument based on the mapped monument and the gravity plane; and
   outputting the one or more slopes of the monument.

2. The method of claim 1, wherein each marker of the set of markers, is positioned at a predetermined distance from another marker of the set of markers and further comprising:
   determining, based on the set of markers, a scale for the monument;
   detecting, in the set of two or more images, one or more features of the monument;
   generating a set of measurements based on the detected one or more features; and
   outputting the set of measurements.

3. The method of claim 2, wherein the detection of one or more features is based on another set of markers positioned on the monument.

4. The method of claim 2, further comprising outputting a report based on the one or more slopes and the set of measurements, wherein the set of measurements include at least a distance and an elevation change.

5. The method of claim 2, further comprising outputting a pass/fail score for the monument based on the set of measurements.

6. The method of claim 1, wherein the virtual representation comprises a point cloud or a three-dimensional model of the monument environment.

7. The method of claim 6, further comprising outputting a three-dimensional drawing based on the three-dimensional model.

8. A leveling device comprising:
   a surface having two or more markers affixed to the surface, the surface configured to position the two or more markers on a plane;
   an inclinometer configured to measure an angle of the plane with respect to gravity;
   one or more actuators configured to adjust the angle of the plane; and
   a controller configured to instruct the one or more actuators to automatically adjust the angle of the plane based on the measured angle to level the plane.

9. The leveling device of claim 8, wherein the surface comprises:
   a top plate; and
   two or more arms detachably coupled to the top plate, wherein the two or more markers are affixed to the two or more arms.

10. The leveling device of claim 9, wherein the two or more arms are configured to fit in slots in the top plate.

11. The leveling device of claim 10 wherein the two or more markers are fixed at a predetermined location on the two or more arms and wherein the slots are configured to position the two or more arms at a predetermined angle and distance from each other.

12. The leveling device of claim 8 further comprising a battery mount configured to accept a tool battery.

13. The leveling device of claim 8 wherein the one or more actuators comprise at least one stepper motor or a linear actuator.

14. The leveling device of claim 8, wherein the inclinometer comprises a dual axis inclinometer.

15. A system for inspecting a monument, comprising:
an imaging device configured to obtain a set of two or more images of a monument environment;
a leveling device configured to position a set of markers on a plane level with respect to gravity, wherein the leveling device is configured to automatically level the markers; and
one or more non-transitory program storage devices comprising instructions stored thereon to cause one or more processors to:
detect the set of markers in the obtained set of two or more images;
generate a virtual representation of the monument environment with respect to gravity based on the obtained set of two or more images;
map the monument to a virtual representation;
determine, one or more slopes and dimensions of the monument based on the mapped monument and the gravity plane; and
output the one or more slopes of the monument.

16. The system of claim 15, wherein each marker of the set of markers, is positioned at a predetermined distance from another marker of the set of markers, and wherein the one or more non-transitory program storage devices comprise instructions stored thereon to cause one or more processors to:
determine, based on the set of markers, a scale for the monument environment;
detect, in the set of two or more images, one or more features of the monument;
generate a set of measurements based on the detected one or more features; and
output the set of measurements.

17. The system of claim 16, wherein the detecting of one or more features is based on another set of markers positioned on the monument.

18. The system of claim 16, wherein the one or more non-transitory program storage devices comprise instructions stored thereon to cause one or more processors to output a report based on the one or more slopes and the set of measurements.

19. The system of claim 18, wherein the one or more non-transitory program storage devices comprise instructions stored thereon to cause one or more processors to output a pass/fail score for the monument based on the set of measurements.

20. The system of claim 15, wherein the virtual representation comprises a point cloud or a three-dimensional model of the monument environment.

21. The method of claim 1, wherein generating the virtual representation of the monument environment with respect to gravity includes:
determining the gravity plane based on the detected set of markers in the obtained set of two or more images; and
aligning the virtual representation with the determined gravity plane.

22. The system of claim 15, wherein instructions to generate the virtual representation of the monument environment with respect to gravity further comprises instructions to cause the one or more processors to:
determine the gravity plane based on the detected set of markers in the obtained et wo or more images; and
align the virtual representation with the determined gravity plane.

* * * * *